No. 860,846. PATENTED JULY 23, 1907.
O. B. BEACH.
RESILIENT TIRE FOR VEHICLE WHEELS.
APPLICATION FILED APR. 17, 1906.

4 SHEETS—SHEET 1.

Witnesses.
William R. Froti
Eugenia C. Bradley

Inventor,
Oliver B. Beach

No. 860,846. PATENTED JULY 23, 1907.
O. B. BEACH.
RESILIENT TIRE FOR VEHICLE WHEELS.
APPLICATION FILED APR. 17, 1906.
4 SHEETS—SHEET 2.
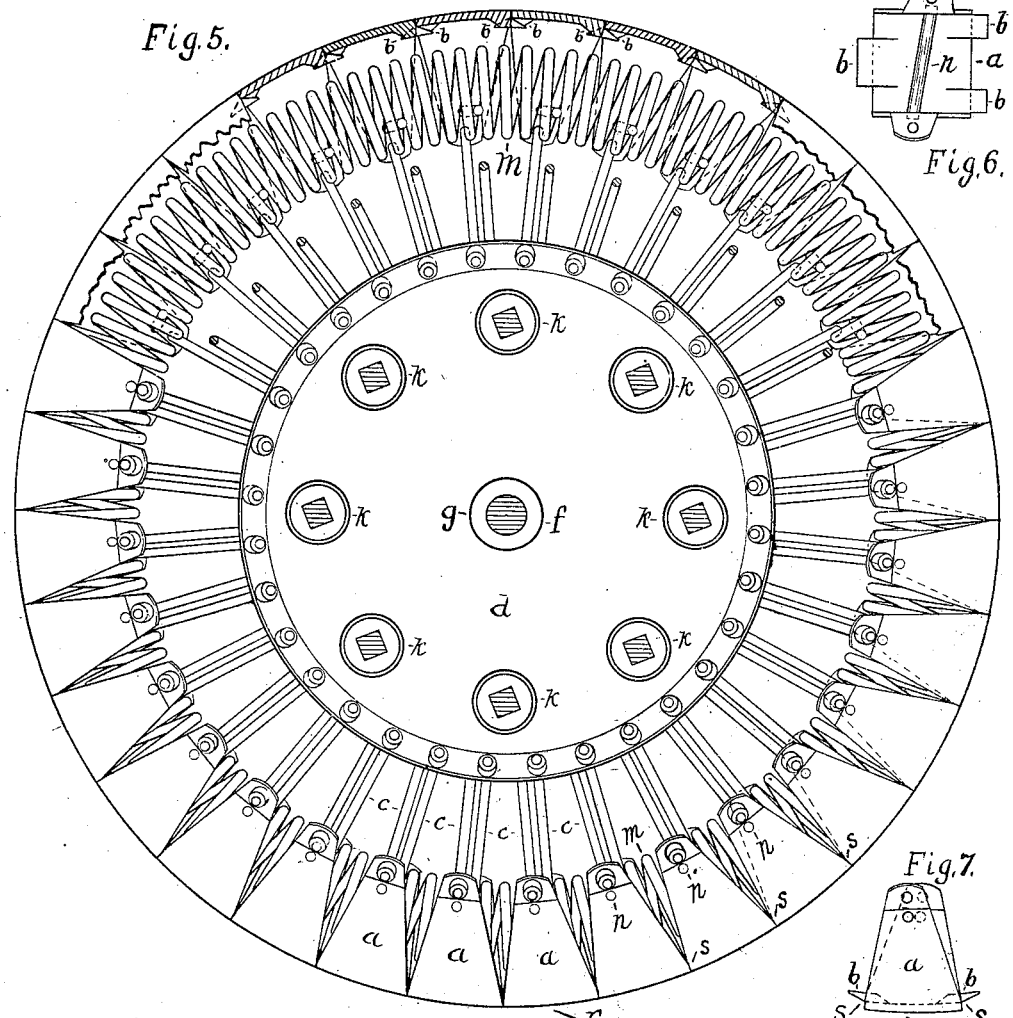
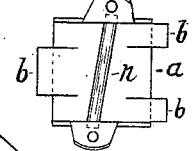
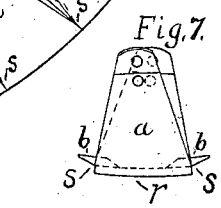
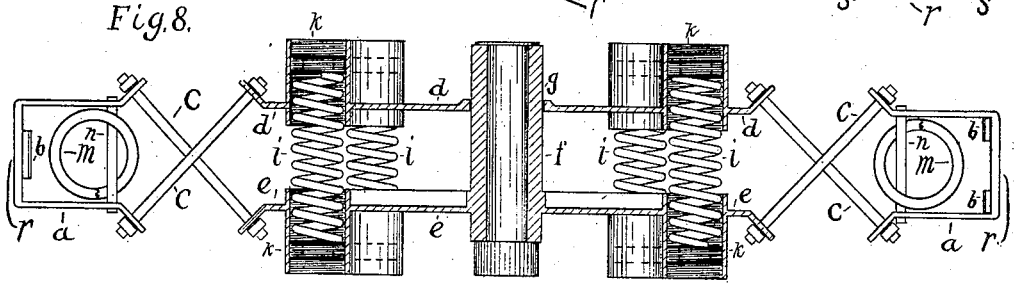
Witnesses.
William R. Foote
Eugenia C. Bradley
Inventor.
Oliver B. Beach No. 860,846. PATENTED JULY 23, 1907.
O. B. BEACH.
RESILIENT TIRE FOR VEHICLE WHEELS.
APPLICATION FILED APR. 17, 1906.

4 SHEETS—SHEET 3.

Witnesses.
William R. Foote
Eugenia C. Bradley

Inventor.
Oliver B. Beach

No. 860,846. PATENTED JULY 23, 1907.
O. B. BEACH.
RESILIENT TIRE FOR VEHICLE WHEELS.
APPLICATION FILED APR. 17, 1906.

4 SHEETS—SHEET 4.

Witnesses.
John K. Wortham
William J. Klock

Inventor,
Oliver B. Beach

UNITED STATES PATENT OFFICE.

OLIVER B. BEACH, OF STONY CREEK, CONNECTICUT.

RESILIENT TIRE FOR VEHICLE-WHEELS.

No. 860,846.　　Specification of Letters Patent.　　Patented July 23, 1907.

Application filed April 17, 1906. Serial No. 312,153.

*To all whom it may concern:*

Be it known that I, OLIVER B. BEACH, a citizen of the United States, residing at Stony Creek, in the county of New Haven and State of Connecticut, have invented a new and useful Resilient Tire for Vehicles, of which the following is a specification.

Figure 1:
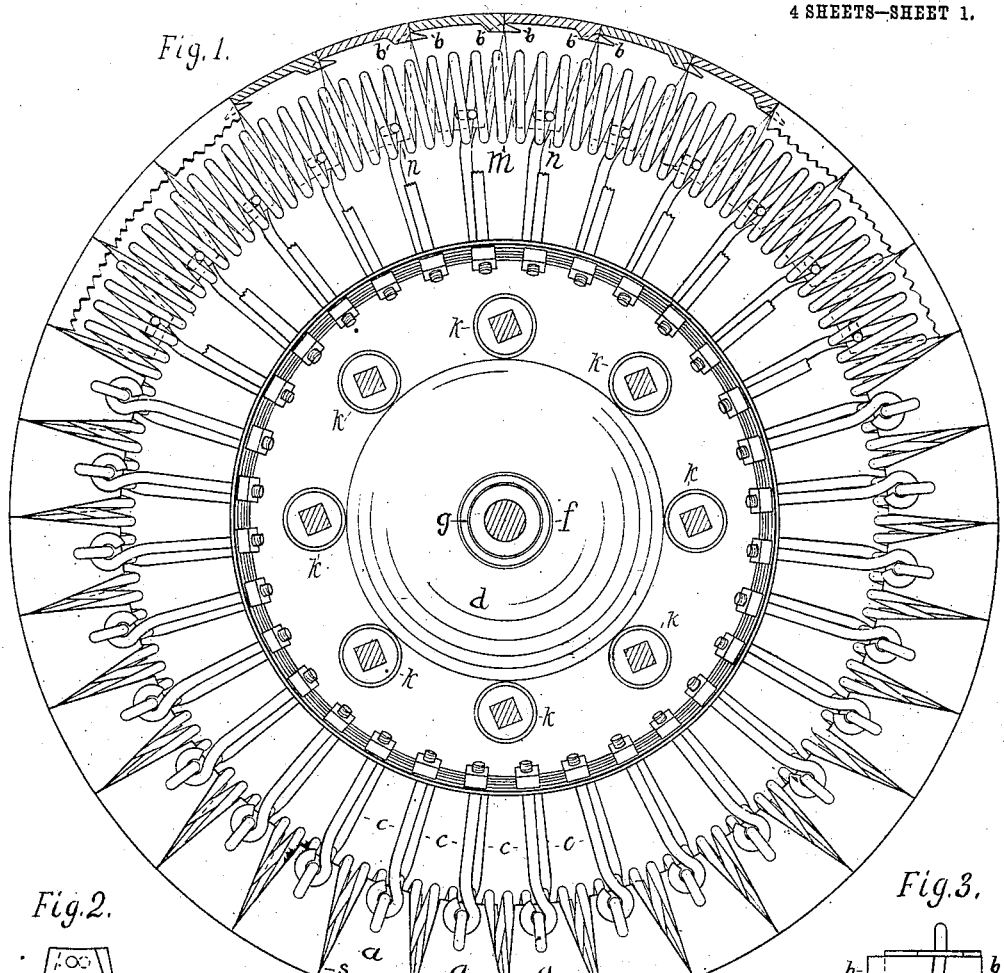
Figure 2:
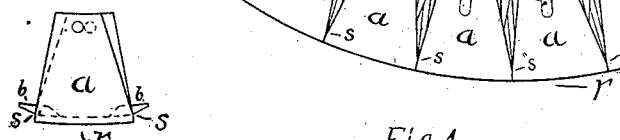
Figure 3:
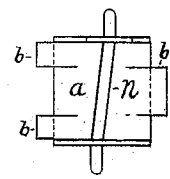
Figure 4:
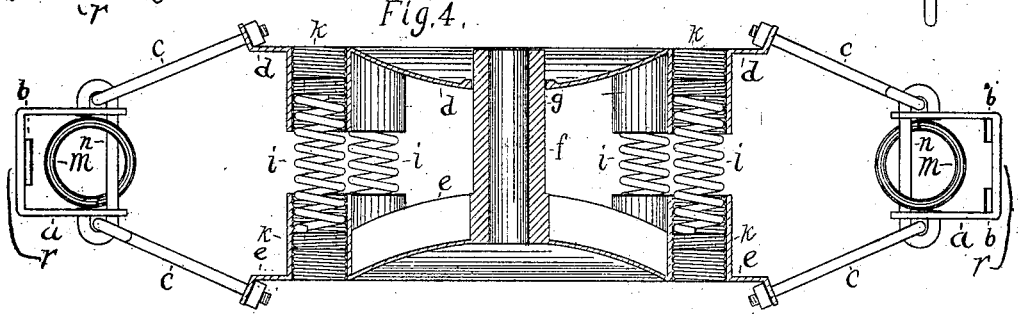
Figure 9:
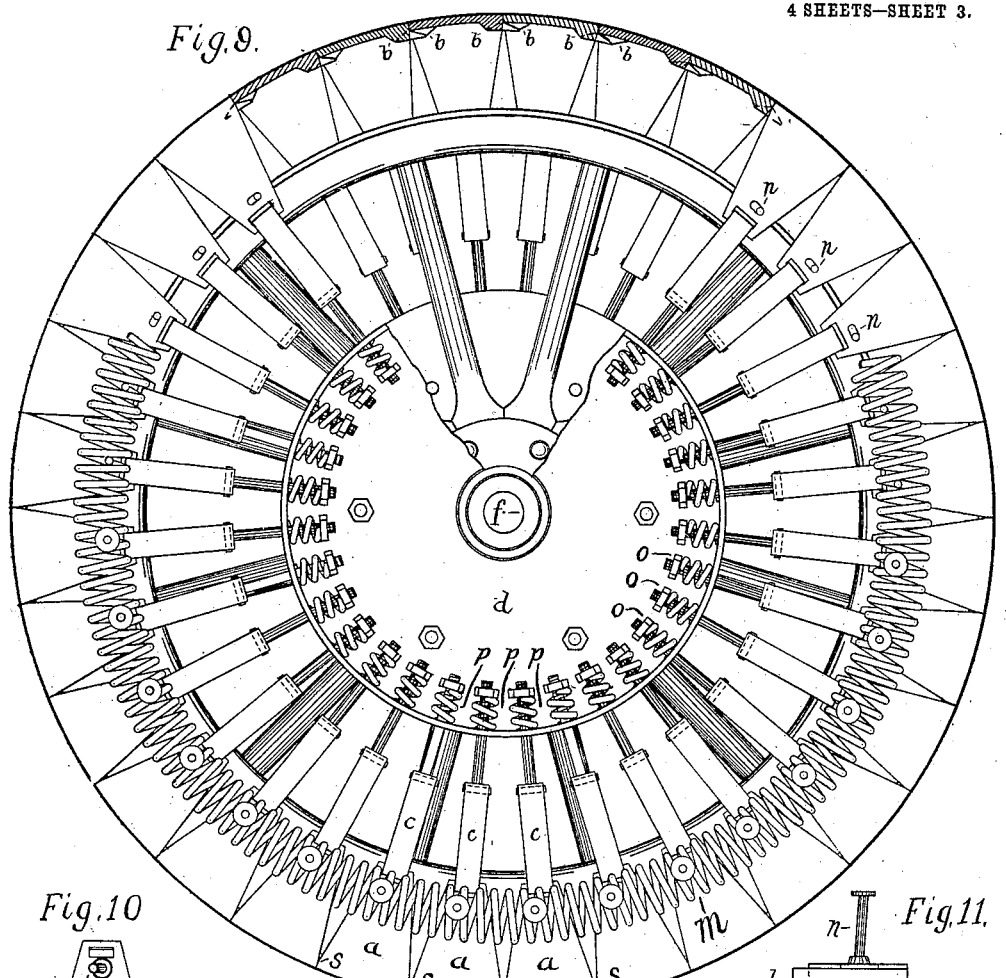
Figure 10:
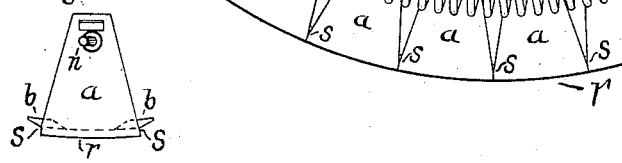
Figure 11:
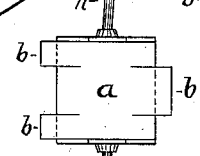
Figure 12:
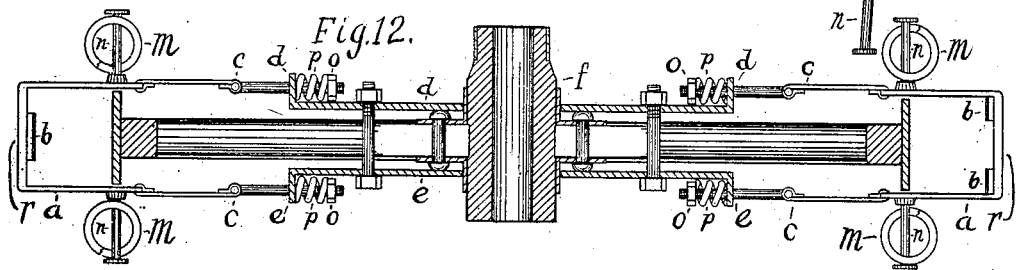
Figure 13:
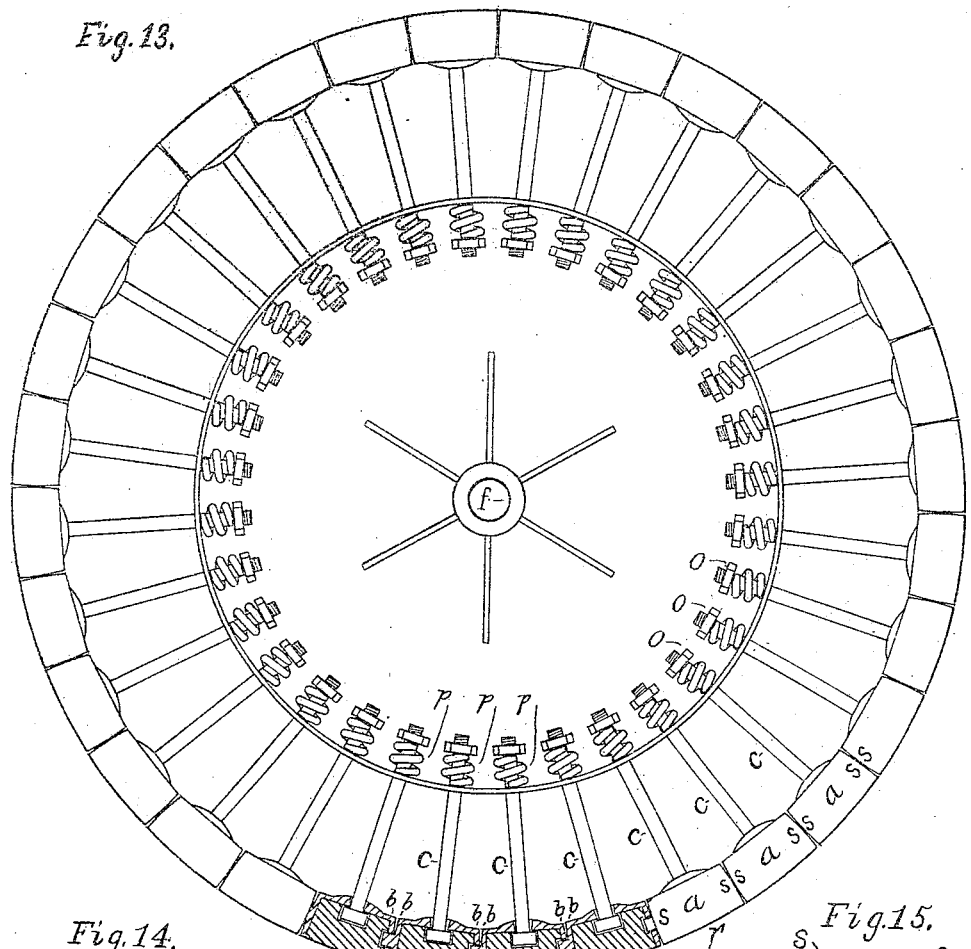
Figure 14:
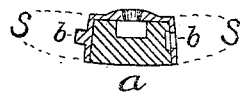
Figure 15:
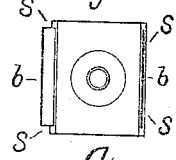
Figure 16:
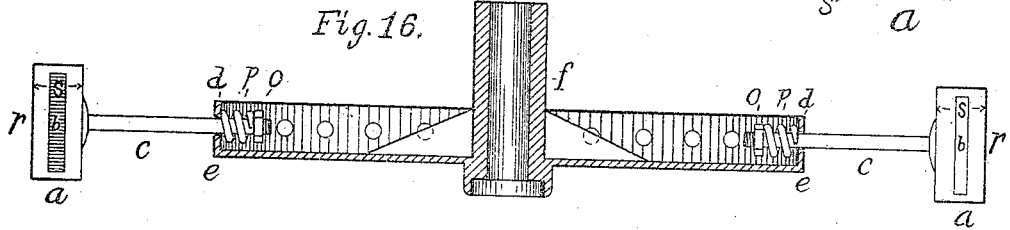

My invention relates to improvements in resilient tires in which the resiliency is accomplished by the tread of the tire yielding to the surface of the road and the object of my invention is to provide a tire that will not get punctured or cut as is the case with the so called pneumatic or rubber tires and which will possess their good qualities. I attain these objects by the mechanism illustrated in the accompanying drawing, in which Figure 1 is a side view showing the outside and also sectional view of the working parts. Fig. 2 a side view of a single segment. Fig. 3 a top view of a single segment. Fig. 4 is a cross sectional view through the center of Fig. 1. Fig. 5 is a modified form of Fig. 1 showing how the stays $c$, can be crossed when circumstances make it necessary to do so. Fig. 6 is a top view of a single segment. Fig. 7, is a side view of a single segment. Fig. 8, is a cross sectional view through the center of Fig. 5. Fig. 9, is a side view showing the outside and also sectional view of the working parts of another modified form. Fig. 10, is a side view of a single segment. Fig. 11, is a top view of a single segment. Fig. 12, is a cross sectional view through the center of Fig. 9. Fig. 13 is a side view showing the outside and also sectional view of the working parts of another modified form. Fig. 14 is a side view of a single segment. Fig. 15 is a top view of a single segment. Fig. 16 is a cross sectional view through the center of Fig. 13.

Similar letters refer to similar parts throughout the several views.

This tire consists of a series of segments $a$, forming a circle. Each segment is secured to the other by male and female ends $b$, and held securely in place by the strain on the stays $c$, which are made of rope or leather straps or metal bolts and are connected to the segments $a$, on one end and to the disks or flanges $d$, and $e$, on the hub $f$, on the other. If bolts are used for stays $c$, they are free to slide in the holes where they pass through disks $d$, and $e$, which is necessary in order to allow the tire to become flattened where it is depressed by pressure by coming in contact with the road stones & etc. If rope or straps are used for stays $c$, they can be fastened permanently to the segments $a$, and to the disks $d$, and $e$, or hub as they will double up when the tire is flattened.

The tire holds itself in a circle with considerable force owing to the strain on the stays $c$, but is free to yield when sufficient pressure is applied to one side as is the case where it rests on the surface of the road, owing to the spring or yielding of the several parts of its construction, but to further increase this resiliency I provide the stays $c$, with a connection that will yield, a simple way being to provide the hub $f$, with disks $d$, and $e$, where said stays $c$, are secured. The disk $d$, is free to move on the shaft $g$, of the hub $f$, Figs. 4, and 8, and is forced apart from disk $e$, which is a part of hub $f$, with springs $i$, as the stays $c$, are forced to a more oblique angle by the action of these springs it is evident that the tension of the springs $i$, regulates the stiffness of the tire as by their forcing the disks $d$, and $e$, apart it increases the tension on the stays $c$, which in turn increases the tension on the tread of the tire $r$. For convenience I provide adjustment plugs $k$, which can be screwed down against springs $i$, more firmly to stiffen the tire or unscrewed to soften it as occasion requires thereby adjusting the tire to a nicety and it also proves an effectual way of taking up the wear. The carrying capacity of the tire can also be greatly increased by having the shoulders, on the segments $a$ extend further in from the tread $r$ as shown by Fig. 13.

To add to the even working of the tire I have a large spring $m$, extend the full circumference of the tire which is secured to each segment by the pins $n$, which merely pass through between the coils of the spring $m$, and by this arrangement the segments $a$ are not only independently and firmly secured to the spring $m$, but they can be taken out or replaced without taking out the pins $n$, as the pins $n$, are merely slipped in between the coils of the spring $m$. In cases where it is desirable to attach the tire to a wheel already on a vehicle it is necessary to use the modified form shown in Figs. 9, to 12, in which two springs $m$, $m$, are used instead of one as previously explained and the adjustment is accomplished by the nuts $o$, and the resiliency supplied by the springs $p$. In this modification the disks $d$, and $e$, are shown bolted to a wheel such as is ordinarily used on automobiles. The spring or springs $m$, as the case may be prevents the segments $a$, from snapping against each other as the tire passes over stones & etc., and also serves to make the pressure uniform on the segments that are flat on the road.

Having described my invention and having shown how the tire may be attached and successfully operated in different ways, I do not wish to be limited as to how it shall be attached as so many ways suggest themselves and other ways than those shown can also be successfully employed and I therefore wish to have my invention regarded as a tire to be attached by any suitable means to a wheel or axle of a vehicle.

I claim:

1. A tire composed of segments $a$ secured together at the tread $r$ having their inward ends much shorter thereby giving said segments freedom to oscillate and form themselves to the shape of the surface of the road as they pass over it, and having stays $c$ connecting said segments with the flanges $d$ and $e$ of a wheel substantially as described 2. A tire composed of segments $a$ secured together and held in a circle by being connected with the flanges $d$ and $e$ of a wheel by the stays $c$ and having the spring $m$ connecting each segment substantially as described.

3. A tire composed of segments $a$ secured together at the tread $r$ having their inward ends much shorter so that said segments can oscillate one upon the other and having the spring $m$ connecting the inward ends of each segment, thereby giving stiffness, resiliency and life to the tire and having stays $c$ connecting said segments to the flanges $d$ and $e$ of a wheel substantially as described.

4. A tire composed of segments $a$ having the shoulders $s$ of sufficient radial length to give carrying capacity in proportion to the strain on the stays $c$, said stays being connected to the rim of a wheel substantially as described.

5. A tire composed of segments $a$ connected with the rim of a wheel by the stays $c$ said stays being provided with springs $p$ for the purpose of allowing said tire to become flattened when sufficient pressure is applied substantially as described.

OLIVER B. BEACH.

Witnesses:
WILLIAM THOM,
FREDERICK L. JACKSON.